United States Patent [19]

Elsner et al.

[11] Patent Number: 4,859,106
[45] Date of Patent: Aug. 22, 1989

[54] DEVICE FOR CONNECTING TWO COAXIAL COMPONENTS FIXEDLY IN TERMS OF ROTATION

[75] Inventors: Ernst Elsner, Herbrechtingen; Hans Lindenthal, Heidenheim, both of Fed. Rep. of Germany; Stewart D. Jelfs, Worcester, England

[73] Assignee: J.M. Voith GmbH, Fed. Rep. of Germany

[21] Appl. No.: 127,414

[22] Filed: Dec. 2, 1987

[51] Int. Cl.[4] .............................................. F16B 2/04
[52] U.S. Cl. .......................................... 403/5; 403/15
[58] Field of Search ...................................... 403/5, 15

[56] References Cited

U.S. PATENT DOCUMENTS 4,616,948 10/1986 Jelfs ......................................... 403/5

*Primary Examiner*—Andrew V. Kundrat
*Attorney, Agent, or Firm*—Ostrolenk, Faber, Gerb & Soffen

[57] ABSTRACT

The invention relates to a device for connecting fixedly in terms of rotation two coaxial components, for example a shaft and a hub, preferably with an outer and an inner sleeve which enclose a tapered annular space and in which a likewise tapered annular piston is axially displaceable by means of a pressure medium, as a result of which a radial tensioning force is exerted on the components to be connected. For this purpose, either one of the two pressure chambers on the two end faces of the piston is subjected to pressure. According to the invention, the pressure medium is conveyed to the rear pressure chamber by means of a duct which opens into the annular space in the front region of the annular piston and from there passes, via slots in the outer cylindrical surface of the annular piston, to the rear pressure chamber. As a result, the wall of the outer sleeve in the region of the rear pressure chamber remains free of a bore for the pressure medium which is made with the removal of material and which is subject to large positional tolerances. The wall can therefore be made thinner.

19 Claims, 1 Drawing Sheet

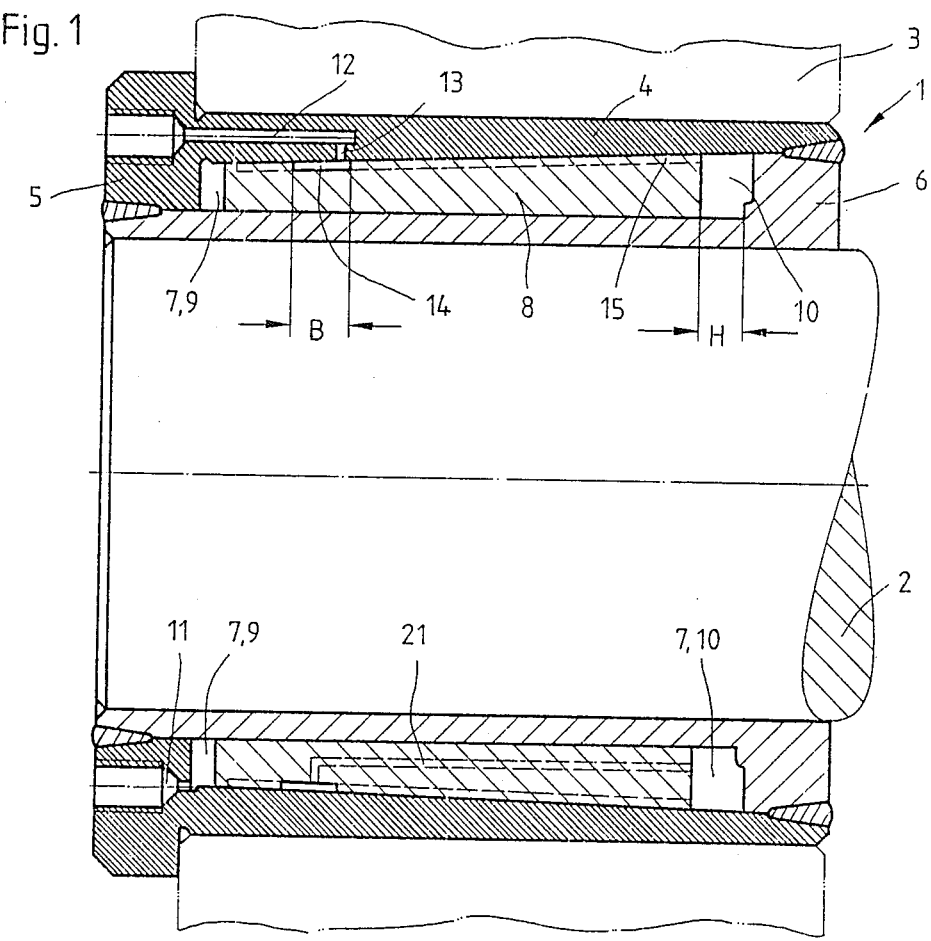
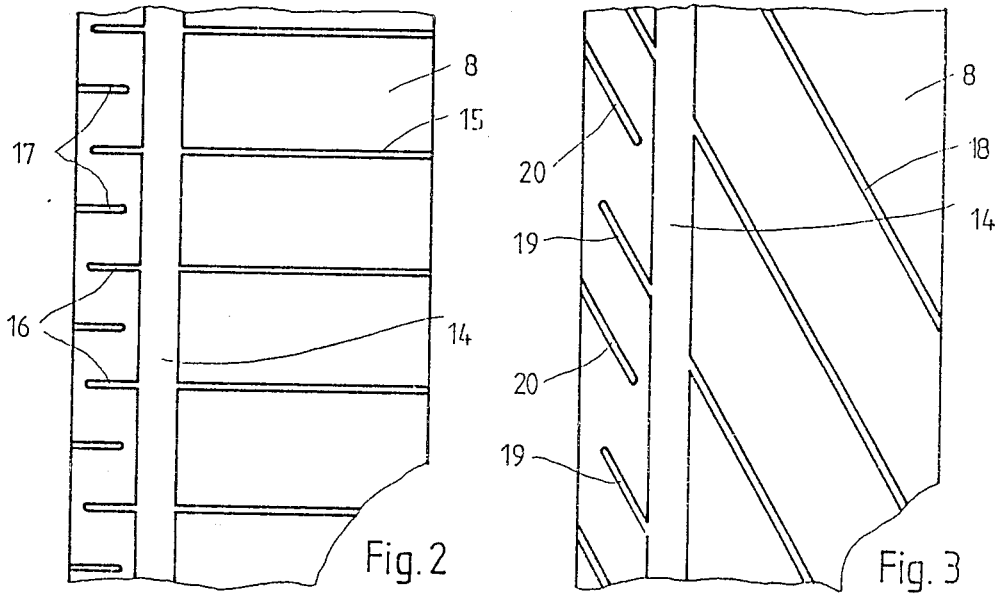

DEVICE FOR CONNECTING TWO COAXIAL COMPONENTS FIXEDLY IN TERMS OF ROTATION

BACKGROUND OF THE INVENTION

The invention relates to a device for connecting fixedly in terms of rotation two components arranged coaxially in one another, for example a shaft to a hub, by means of a tapered piston shiftable axially in a tapered slot for selective connection and disconnection of the two components. A device of this type is known form WO 84/04367 (U.S. Patent Specification No. 4,616,948).

In specific types of the known device, the two pressure chambers on the end faces of the conical annular space and of the tapered annular piston are supplied with pressure medium from one end face of the device. This purpose is served by axially directed ducts, one of which is arranged within a wall of the device, extends over virtually the entire length of the conical annular chamber and opens into the rear pressure chamber. For this, it is necessary to drill a very deep duct, and it can happen that the drill deviates obliquely from the intended drilling direction, especially when high-strength material is used. It therefore becomes unavoidable to make the wall of the drilled-through sleeve disproportionately thick to take account of directional errors in drilling. At the weakest point of the rear pressure chamber, the wall thickness corresponds approximately to 3 times the diameter of the cut. This results in large external dimensions of the device and consequently of the rotational connection as a whole, and also results in centering inaccuracies when the bore to the rear pressure chamber runs very close to the cylindrical surface of the annular chamber.

The torque which can be transmitted by the device depends on the useful axial length of the device and therefore also on the length of the annular piston. Consequently, with the device having a specific outside diameter, the useful length of the piston and therefore of the device is restricted by the second duct drilled up to the rear pressure chamber.

The annular piston of the known device has axially or spirally arranged grooves on its outer and on its inner cylindrical surface. These grooves serve for distributing lubricant between the surfaces touching one another, in order to produce a smooth axial movement of the annular piston during the supply of pressure to one of the pressure chambers and radial tension on the hub and shaft. Furthermore, these grooves also serve for distributing the pressure exerted by the pressure medium over the entire inner and outer cylindrical surface of the annular piston. As a result, there is also a radial expansion of the device and the piston moves more easily.

SUMMARY OF THE INVENTION

The object of the invention is to develop the known device in such a way that, while the device has the same external dimensions, it can transmit a higher torque and can be produced more easily.

According to the invention, this object is achieved because the second duct does not extend over its full length within one of the walls of the annular space from one end face of the device to the rear pressure chamber. Instead, this duct opens out as early as the front region of the annular space, and still in the sliding region constantly covered by the annular piston. The pressure medium is transferred to the rear pressure chamber by means of grooves in one of the cylindrical surfaces of the annular piston or of the annular chamber. In the invention, the abovementioned grooves perform not only the function of distributing the pressure medium for lubrication purposes, but also a further function, in particular the transfer of the pressure medium from the region where the second duct opens out into the annular space to the rear pressure chamber.

The following advantage is thereby afforded, namely that the second duct no longer has to be drilled to such depth in a wall surrounding the annular space, thus reducing the danger that the drill will come out of alignment. A further advantage is also to be seen in the fact that none of the walls forming the annular space need contain a drilled duct in the region of the rear pressure chamber any longer. It has thus become possible for the tapered annular space and the annular piston to have a greater length in the longitudinal direction of the device. The annular space and annular piston or the device as a whole can now be extended until the wall thickness of the inner or outer sleeve having the tapered cylindrical surface attains, in the region of the rear pressure chamber, a minimum wall thickness which is governed by the construction. If a minimum wall thickness corresponding approximately to one and a half times the diameter of the second duct is assumed, an extension of approximately twenty percent is therefore possible, for a given conicity of the tapered annular space and annular piston. This corresponds to an increase in the transmittable torque of likewise approximately twenty percent, with an extension of the coupling as a whole of approximately ten percent. In other words, a device with the given outside diameter can transmit a higher torque if it has a greater axial length, and in order to transmit a predetermined torque a device with a smaller outside diameter than hitherto can be used.

According to advantageous embodiments of the invention, the device can either be an integral part of a hub on the outside to be connected to the shaft inside or be an independent component with an outer sleeve and an inner sleeve, the inner sleeve preferably having cylindrical inner and outer surfaces, while the outer sleeve has a cylindrical outer surface and a tapered inner surface. In the region where the second duct opens into the annular space, an annular slot can be made in at least one of the cylindrical surfaces of the annular space, preferably of the annular piston, which are in mutual sealing contact, the minimum width of the said annular slot being greater than the maximum stroke of the annular piston in the annular space. The grooves in one of the cylindrical surfaces of the annular space or of the annular piston start from the annular slot and open into the rear pressure chamber. These grooves in one of the cylindrical surfaces, preferably in the cylindrical surface of the annular piston, can be designed as either axially directed or spiral slots. According to a further development, the line connection between the annular slot and the rear pressure chamber can be made by means of a duct arranged within the annular piston. Moreover, axially directed or spiral slots can be arranged in the front region of the cylindrical surfaces of the annular space or of the annular piston, some of these starting from the annular slot and stopping short of the end face of the annular piston and some starting from the front pressure chamber and stopping short of the annular slot. As in the known device, the function of these slots is merely to lubricate the contact surfaces between the annular piston and the annular space or put them under tension. Only the slots leading to the rear pressure space have a further function, in particular conveying the pressure medium from the annular slot into the rear pressure chamber.

BRIEF DESCRIPTION OF THE DRAWINGS

The invention is explained in detail below with reference to the drawing which illustrates an exemplary embodiment. In the drawing:

FIG. 1 shows a longitudinal section through the device according to the invention.

FIG. 2 and FIG. 3 each show a plane view of the laid-out tapered annular piston.

DESCRIPTION OF A PREFERRED EMBODIMENT

FIG. 1 illustrates a device 1 which makes a connection fixedly in terms of rotation between a shaft 2 on the inside and a hub 3 on the outside. In the present exemplary embodiment, it consists of an outer sleeve 4 with a flange on one end face 5 and of an inner sleeve 6 connected to the outer sleeve, for example by means of welding. The outer sleeve and inner sleeve enclose a tapered annular space 7 which is formed by a cylindrical outer surface of the inner sleeve 6 and by the tapered inner surface of the outer sleeve 4 and which widens from the front end face 5 towards the opposite end face. Located within the annular space 7 is a likewise tapered annular piston 8, the outer cylindrical surfaces of which correspond to the inner surfaces of the annular space 7 and rest sealingly against these. The annular piston 8 is axially displaceable in both directions in the annular space 7, so that, when it is displaced in one direction, the outer and inner sleeves 4, 6 are tensioned radially on the shaft 2 and hub 3 respectively, and when it is displaced in the other direction the two parts are released.

The piston 8 is displaced axially by forcing pressure medium into either one of the annular pressure spaces 9, 10 which are located between the end faces of the piston 8 and of the annular space 7. A first duct 11 starting from the end face 5 serves for supplying pressure medium to the front pressure space 9. A second duct 12 starting from the end face 5 and extending in the wall of the outer sleeve 4 leads to the rear pressure chamber 10 and opens into the front region of the annular chamber 7, the said front region being covered constantly by the annular piston 8. For transfer of the pressure medium, the annular piston 8 is provided with an annular slot 14 which is wide enough to ensure that the mouth 13 of the second duct opens into the annular slot 14 in the two end positions of the annular piston 8 when the device is between the tensioned and the relieved state. Slots 15 lead from this annular slot 14 to the rear end face of the piston 8 and thus into the rear pressure chamber 10. Because the pressure medium is guided in this way partially in the wall of the outer sleeve 4 and partially in the slots of the outer cylindrical surface of the piston 8, it is possible to make the wall of the outer sleeve 4 in the region of the rear pressure chamber 10 thinner, that is to say only with the minimum wall thickness governed by the strength required, because there is no duct in this region. The length of the piston and of the annular space, that is to say of the device, can thereby be increased in comparison with the known device, and the transmittable torque can consequently be increased considerably, without the outside diameter of the device being enlarged. To transfer the pressure medium to the rear pressure chamber 10, instead of the slots 15 in the cylindrical surface of the annular piston 8 there can be a duct 21 which is located within the annular piston 8 and which connects the rear end face of the latter to the annular slot 14.

FIG. 2 shows a plan view of the laid-out surface of the piston 8. Axial slots 15 extend from the annular slot 14, open axially into the rear end face of the piston 8 and thus make a connection between the second duct 12 opening into the region of the annular slot 14 and the rear pressure chamber 10. Furthermore, axial slots 16 extend from the annular slot 14 towards the front region of the cylindrical surface of the annular piston 8. However, these slots 16 stop short of the front end face and serve merely for distributing the pressure medium, if possible over the entire surface, for lubrication purposes during the displacement of the piston 8 and for expanding the sleeves 4 and 6 during the exertion of pressure. The cylindrical surface of the annular piston 8 at the same time has slots 17 which start from the front end face of the piston and extend only near to the annular slot, but do not open into this, and which perform the same function as the slots 15 and 16 when the front pressure chamber 9 is subjected to pressure.

FIG. 3 illustrates a further embodiment of the grooves in the cylindrical surface of the annular piston 8. The grooves are designed as spiral slots 18 and extend from the annular slot 14 up to the rear end face of the piston 8. At the same time, there are spiral slots 19 which start from the annular slot 14 towards the front part of the cylindrical surface and which stop short near the front end face of the annular piston 8. Likewise, slots 20 can start from the front end face of the annular piston 8 or the front pressure chamber 9, are also made spiral, run between the slots 19 and stop short of the annular slot 14.

As in the known device, the inner cylindrical surface of the annular piston 8 facing the inner sleeve 6 can be equipped with mutually engaging axial or spiral slots for distributing the pressure medium over this pair of surfaces.

What we claim is:

1. A device for fixedly connecting two coaxial objects for rotation together, wherein one object is radially outward and the other object is radially inward, the device comprising:

an inner component around the inner object and an outer component at the outer object; the inner component being coaxially disposed inside the outer component, the outer component having an inner surface and the inner component having an outer surface and the surfaces being respectively shaped for defining between them and enclosing a tapered annular space, and means at the outer and inner components for making the annular space pressure tight relative to the outside;

a tapered shape annular piston located in the annular space, the piston having respective outward and inward annular surfaces adapted for resting sealingly against the inner surface of the outer component and outer surface of the inner component; the piston being axially displaceable in one direction in the annular space selectively for bringing the annular surfaces of the piston to sealingly rest against the annular surfaces of the outer and inner components for pressing the components outward against the objects for causing the objects to rotate together and being axially displaceable in the opposite direction to discontinue the sealing resting;

the device having axially opposite, front and rear end faces, with the front end face being toward the radially narrow end of the tapered annular space and the rear end face being toward the radially wider end of the annular space; a front annular pressure chamber being formed between the front end face of the device and the piston and between the inner and outer components; a rear annular pressure chamber being defined between the rear end face of the device and the rear of the annular piston and between the inner and outer components;

a pressure medium feed duct for supplying pressure medium to each of the pressure chambers; the feed duct including a first duct leading to the front pressure chamber and including a second duct leading to the rear pressure chamber, the second duct extending within a wall of the outer component surrounding the annular space and opening into the annular space;

the annular space having a front region more toward the front chamber than toward the rear chamber; the second duct opening into the front region of the annular space, sufficiently rearward in the annular space that even as the piston shifts axially through the annular space, the axial position of the opening of the second duct is covered by the annular piston;

grooves extending axially along the annular space and connected respectively to the front pressure chamber and to the rear pressure chamber; at least one of the grooves defines a connection for a pressure medium between the opening of the second duct into the annular space and the rear pressure chamber; and the grooves connecting to the front pressure chamber extend rearwardly from the front pressure chamber and stop short of the region where the second duct opens into the annular space.

2. A device according to claim 1, wherein the outer object is around the outer component and comprises a hub and the inner object inside the inner component comprises a shaft around which the hub is disposed.

3. The device according to claim 1, further comprising an annular slot in the form of a groove defined in the outward surface of the annular piston and the second duct opening through the wall of the outer component into the annular space at the annular groove.

4. The device according to claim 3, wherein the grooves are slots in the outer annular surface of the annular piston.

5. Device according to claim 3, wherein the annular groove has a minimum width which is greater than the maximum stroke of the annular piston within the annular space between the tensioned position and the relieved position.

6. Device according to claim 3, wherein the grooves are made in the outer annular surface of the annular piston and are slots directed essentially axially.

7. Device according to claim 3, wherein the grooves are made in the outer annular surface of the annular piston and are spiral slots.

8. Device according to claim 3, wherein the connection between the annular slot and the rear pressure chamber is made by means of at least one essentially axial bore within the rear part of the annular piston.

9. Device according to claim 3, wherein the outer annular surface of the annular piston has front slots which start from the annular slot, extend forward towards the front region of the annular surface and stop short of the front end face of the annular piston.

10. Device according to claim 9, further comprising forward most grooves defined in the annular surface of the annular piston between the annular slots and the front end face, start from the front end face of the annular piston and extend near to the annular slot.

11. The device of claim 2, wherein the inner component further comprises an inner sleeve disposed on the shaft, the sleeve having a cylindrical bore shaped for receiving the shaft and for securely holding to the shaft.

12. The device of claim 1, wherein the feed duct enters the device from one end face of the device and extends up to the first and second ducts.

13. The device of claim 2, wherein the feed duct enters the device from the front end face.

14. The device of claim 1, wherein an annular slot is defined in the annular space to be disposed between one of the surfaces of the annular piston and the cooperating surface of one of the components with which the annular piston cooperates, and the second duct opening into the annular slot.

15. The device according to claim 9, wherein the front slots are axially directed.

16. The device according to claim 9, wherein the front slots are spirally directed slots.

17. The device according to claim 10, wherein the forwardmost grooves are axially directed.

18. The device according to claim 10, wherein the forwardmost grooves are spirally directed.

19. The device according to claim 14, further comprising forwardmost grooves defined in the annular surface of the annular piston between the annular slot and the front end face, start from the front end face of the annular piston and extend near to the annular slot.

* * * * *